3,514,429
PENICILLIN-COUPLED HYDRAZIDE POLYMERS

Mark A. Stahmann, Madison, Wis., and Yasuhisa Ohno, Tokyo, Japan; said Ohno assignor to Teijin Limited, Osaka, Japan, a corporation of Japan
No Drawing. Filed Dec. 12, 1967, Ser. No. 689,799
Claims priority, application Japan, Oct. 14, 1967, 42/65,938
Int. Cl. C08f 27/08
U.S. Cl. 260—80.73        3 Claims

ABSTRACT OF THE DISCLOSURE

A process for the preparation of a granular resin containing penicilloyl groups by reacting a penicillin with an acid hydrazide derivative derived from a granular copolymer consisting of 20–90% by weight of a lower aliphatic ester of acrylic acid, 0–79% by weight of a vinyl monomer and 1–10% by weight of N,N'-mono- or polymethylene-bis-acrylamide.

---

This invention relates to a novel water-insoluble penicillin-coupled resin, i.e. penicilloyl-resin having an immunological activity and a process for the preparation thereof. An object of this invention is to obtain a penicillin-coupled resin capable of being used for detection of penicillin-hypersensitive patients and also of being stored for a long period of time. Other objects of this invention will become apparent from the following description.

Penicillin is known to be a useful antibiotic substance. On the other hand, it has been reported in literature that in repeated administration, it leads patients of allergic constitution to convulsion, fainting, and even to death owing to shock. To alleviate such danger in administration, attempts have been made heretofore to detect penicillin-hypersensitive patients by skin tests before administration using penicillin or penicillin-poly-L-lysine conjugate. But such attempts have not been materialized into seviceable methods as such tests are not so reliable owing, for instance, to the unstability of the reagent used.

We have noticed that an antibody which specially combines with penicillin exists in the serum of hypersensitive patients and since penicillin possesses only one determination group of antigenicity and is soluble in water, a complex of penicillin with the antibody also becomes water-soluble and does not cause precipitation and agglutination reaction. With this in mind, we have assiduously examined whether or not it is possible to use in agglutination reaction a water-insoluble resin chemically coupled with many penicillin molecules, and finally arrived at this invention.

We have thus found a process for the preparation of a water-insoluble resin covalently coupled with penicillin by reacting penicillin in an aqueous solution with an acid hydrazide derivative of a finely divided copolymer consisting of a lower aliphatic ester of acrylic acid, a compound having in the molecule a vinyl group copolymerizable with the lower aliphatic ester of acrylic acid, and N,N'-mono or poly-methylene-bis-acrylamide. The lower aliphatic ester of acrylic acid, used herein, means an alkylester of acrylic acid, the said alkyl group having 1–4 carbon atoms. The compound having in the molecule a vinyl group copolymerizable with it specifically comprehends acrylamide, acrylonitrile, acrylic acid, an alkyl ester of methacrylic acid, and vinyl acetate. Such penicillin-coupled resin can be obtained in a finely divided powder form, and can be stored for a long period without undergoing chemical change. It can be used by dispersing and suspending it in a suitable buffer solution such as a 0.01 M potassium phosphate buffer having a pH of 7.0.

The buffer solution is not limited to alkali salts of phosphoric acid, but includes alkali bicarbonates and any other known buffers. In actual use, this suspension is mixed with the serum of a patient by stirring in a vessel with a V-shaped bottom, and left to stand for several hours. The white penicillin-coupled resin will then be agglutinated with the serum according to the penicillin-hypersensitivity of the patient. More particularly, we have studied the correlation between the assumed penicillin hypersensitivity and the highest dilution of the serum (antibody titer) which gave agglutination of the penicillin-coupled resin of this invention, with respect to 49 serum samples from patients whose degree of hypersensitivity to penicillin had been evaluated by a medical doctor. There were 27 patients considered to be penicillin-sensitive, and 8 of them (30%) showed an antibody titer of more than 27. On the other hand, there was no one among 22 patients considered non-sensitive to penicillin who showed an antibody titer of more than 27.

The skin test by means of penicillin-poly-L-lysine considered most reliable among known methods was conducted on the same 49 patients, and only one allergic patient (4% against the total 27 allergic patients) was detected. It is clear therefore that the detecting method of this invention by the use of penicillin-coupled resin is far superior to the known method in respect of sensitivity and reliability.

The copolymer used according to the process of this invention is a finely divided copolymer consisting of 20–99%, preferably 50–95% by weight of a lower aliphatic ester of acrylic acid, 0–79%, preferably 0–50% by weight of a vinyl monomer copolymerizable with the lower aliphatic ester of acrylic acid, and 1–10%, preferably 3–7% by weight of N,N'-mono- or polymethylene-bis-acrylamide. A copolymer containing less than 20% by weight of a lower aliphatic ester of acrylic acid to be converted to acid hydrazide by reaction with hydrazine gives a penicillin-coupled resin containing only less than 1% by weight of penicillin, and such resin is not agglutinated selectively with the serum of a penicillin-sensitive patient. When the content of N,N'-mono- or polymethylene-bis-acrylamide as a cross-linking agent is less than 1% by weight, a hydrazide derivative derived from the copolymer becomes increasingly water-soluble, and therefore the resulting penicillin-coupled resin is not completely water-insoluble. If the content of the cross-linking agent is more than 10% by weight, it becomes difficult to control the form and diameter of the particles of the resulting copolymer. It is thus difficult to produce finely divided particles of the copolymer in a spherical form and with a diameter of about 10 microns which proves to be suitable for the agglutination of the penicillin-coupled resin.

According to this invention, one of the foregoing copolymers is at first reacted with hydrazine to obtain the hydrazide derivative of said copolymer and the resultant hydrazide derivative is further reacted with penicillin thereby a granular penicilloyl resin consisting of a penicilloyl hydrazide derivative of a copolymer containing 20–99%, preferably 50–95% by weight of a lower aliphatic ester of acrylic acid, 0–79%, preferably 0–50% by weight of a compound having in the molecule a $CH_2=CH-$ group copolymerizable with the lower aliphatic ester of acrylic acid and 1–10%, preferably 3–7% by weight of N,N'-mono- or poly-methylene-bis-acrylamide (with the proviso that a total amount of these copolymer components is 100% by weight) is obtained.

Any penicillin or its derivative may be used in this invention so long as it has a 4-membered lactam ring in the molecule and is capable of reacting with the hydrazide group of the said copolymer.

An aqueous solution having a pH in the range of 6 to 10 may be used as a reaction medium.

Now, the invention will be described by examples. Part in the example shows part by weight.

EXAMPLE 1

Twenty parts by volume of a mixture of methanol and water in equal proportions having dissolved therein 4.8 parts of acrcylamide, 0.4 part of N,N'-methylene-bis-acrylamide and 4.8 parts of methyl acrylate was emulsified and dispersed in an oily layer composed of 2 parts by volume of sorbitan mono-oleate as an emulsifier, 156 parts by volume of a mineral oil (having a specific gravity of 0.80 at 25° C.) and 44 parts by volume of carbon tetrachloride. The dispersion, while being vigorously stirred, was saturated with a nitrogen gas. With the addition of 0.1 part of ammonium persulfate and 0.01 part of sodium hydrogensulfite, the temperature of the reaction mixture was raised to 50° C. to initiate polymerization reaction. After maintaining the system at 70° C. for 3 hours, the resulting polymer was separated, washed, and dried. There was obtained 7.7 parts of a finely divided white polymer.

The obtained polymer (7.0 parts) was reacted with 50 parts of 95% hydrazine hydrate for 9 hours at 70° C. The obtained water-insoluble hydrazide derivative was collected by filtration, washed with methanol and dried. Then 1 part of hydrazide derivative was reacted with 7.0 parts of penicillin G at 25° C. while stirring in 50 parts by volume of a 0.1 M tris-sulfuric acid buffer (pH 7.8). After the lapse of 20 hours, the water-insoluble reaction product was centrifuged and thoroughly washed with the said buffer, and after complete removal of soluble penicillin by dialysis method, frozen and dried.

This penicillin-coupled resin contained 12.1 parts of penicillin per 100 parts, and when suspended in an aqueous solution, did not liberate penicillin.

EXAMPLE 2

Emulsion-polymerization was carried out in the same manner as in Example 1 except that 1 part of sorbitan mono-oleate, 7.5 parts of acrylic acid, 0.5 part of N,N'-methylene-bis-acrylamide, and 2.0 parts of ethyl acrylate were used, and 9.6 parts of a copolymer was obtained. Ten parts of a hydrazide derivative of this copolymer was reacted with 2 parts of penicillin G in the same manner as in Example 1. The resulting penicillin-coupled resin contained 1.6 parts of penicillin per 100 parts. The penicillin-coupled resin thus obtained was frozen and dried, and stored for 3 months in a sealed vessel at 4° C. without showing any change in the amount of coupled penicillin.

EXAMPLE 3

N,N'-methylene-bis-acrylamide (0.5 part) was dissolved in 9.5 parts of methyl acrylate, and emulsified and dispersed in 90 parts by volume of distilled water by using 1 part by volume of polyoxyethylene sorbitan trioleate, and emulsion-polymerization was carried out in the same manner as in Example 1. Nine parts of a water- and benzene-insoluble finely divided white polymer were obtained. The reaction of 10 parts of a hydrazide derivative of the resulting polymer at 30° C. for 10 hours with 1 part of penicillin G in 50 parts of a 0.1 M tris-hydrochloric acid buffer (pH 7.5) containing 0.04 part of ethylenediamine tetracetate gave a penicillin-coupled resin containing 5.0 parts of penicillin per 100 parts.

Four parts of this resin thoroughly washed and dried was hydrolyzed for 8 hours at 100° C. in 10 parts by volume of a 0.01 N hydrochloric acid. The filtrate after removal of an insoluble residue was analyzed by means of ion-exchange chromatography to determine the amount of acid decomposition products of penicillin.

EXAMPLES 4 TO 6

Ten parts of a copolymer with a different composition as listed in Table 1 was converted to a water-insoluble hydrazide derivative as described in Example 1. It was reacted with different amounts of penicillin G as listed in Table 1 under the same conditions as in Example 1.

TABLE 1.—COMPOSITION AND PREPARATIVE CONDITIONS FOR PENICILLIN COUPLED RESINS

| Ex. | Composition of copolymers | | | Parts of penicillin in coupling mixture | Parts of penicilin in 100 parts of penicillin resin |
|---|---|---|---|---|---|
|  | AAm (percent) | BIS (percent) | MA (percent) |  |  |
| 4 | 48 | 4 | 48 | 1 | 1.6 |
| 5 | 48 | 4 | 48 | 1 | 5.2 |
| 6 | 75 | 5 | 20 | 2 | 1.3 |

AAm—acrylamide. BIS—N,N'-methylene-bis-acrylamide. MA—methyl acrylate.

What is claimed is:

1. A granular penicilloyl resin which consists of the product of the reaction in an aqueous medium at a pH of from about 6 to about 10 of penicillin with an acid hydrazide derivative, which acid hydrazide derivative is the reaction product of hydrazine and a granular copolymer consisting of 20 to 99% by weight of a lower aliphatic ester of acrylic acid, 0 to 79% by weight of a compound selected from the group consisting of acrylamide, acrylonitrile, acrylic acid, lower alkyl esters of methacrylic acid and vinyl acetate, and 1 to 10% by weight of N,N'-mono- or poly-methylene-bis-acrylamide so that the total amount of the above copolymer components is 100% by weight.

2. A granular penicilloyl resin according to claim 1, wherein said copolymer consists of 20 to 99% by weight of the methyl ester of acrylic acid, 0 to 79% by weight of acrylamide and 1 to 10% by weight of N,N'-methylene-bis-acrylamide.

3. A granular penicilloyl resin according to claim 1, wherein said copolymer contains 50 to 95% by weight of a lower aliphatic ester of acrylic acid, 0 to 50% by weight of a compound selected from the group consisting of acrylamide, acrylonitrile, acrylic acid, lower alkyl esters of methacrylic acid and vinyl acetate, and 3 to 7% by weight of N,N'-methylene-bis-acrylamide.

References Cited

UNITED STATES PATENTS 3,025,265  3/1962  Maeder _____ 260—63

JOSEPH L. SCHOFER, Primary Examiner

S. M. LEVIN, Assistant Examiner

U.S. Cl. X.R.

260—86.1; 424—12, 81